Patented June 30, 1953

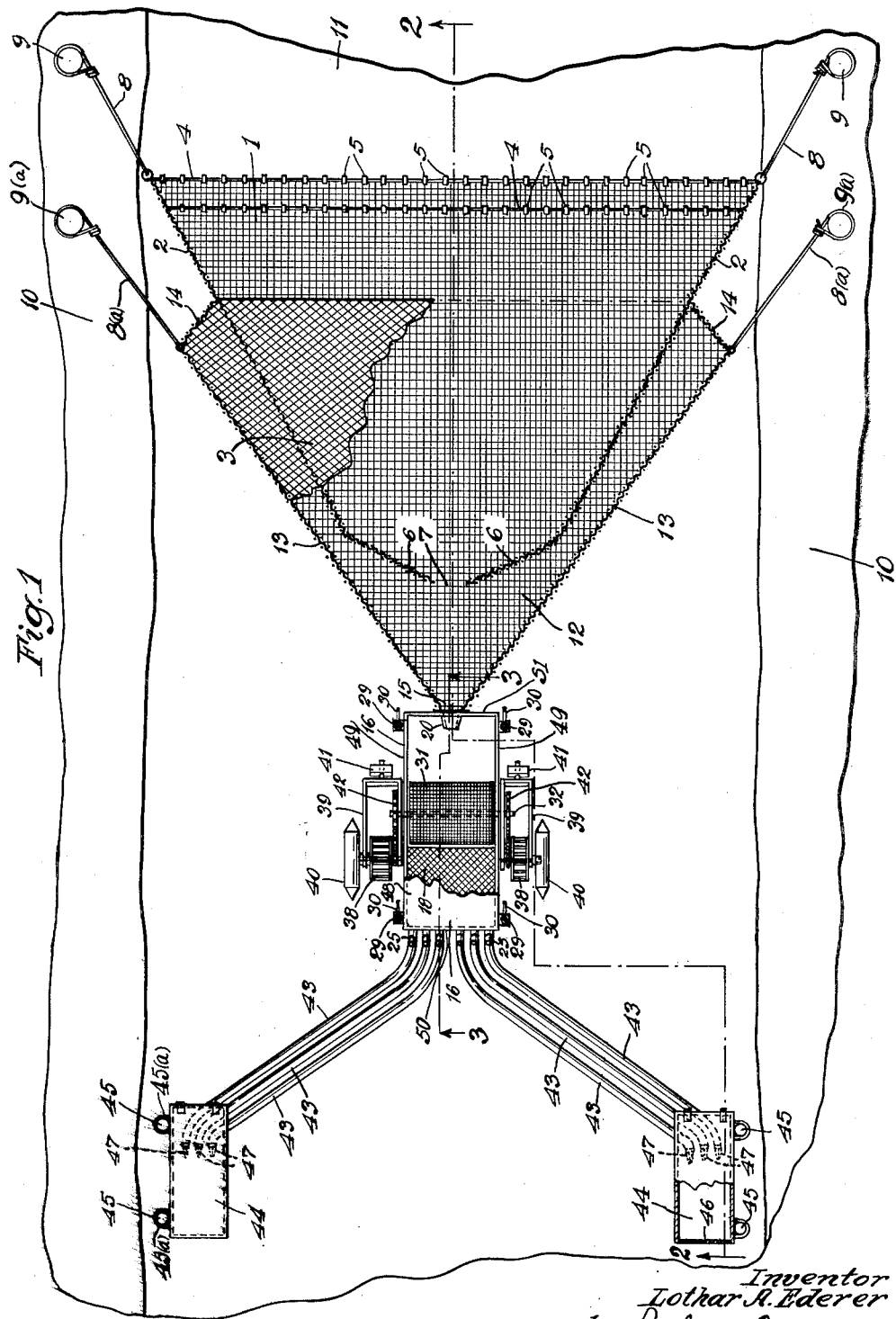

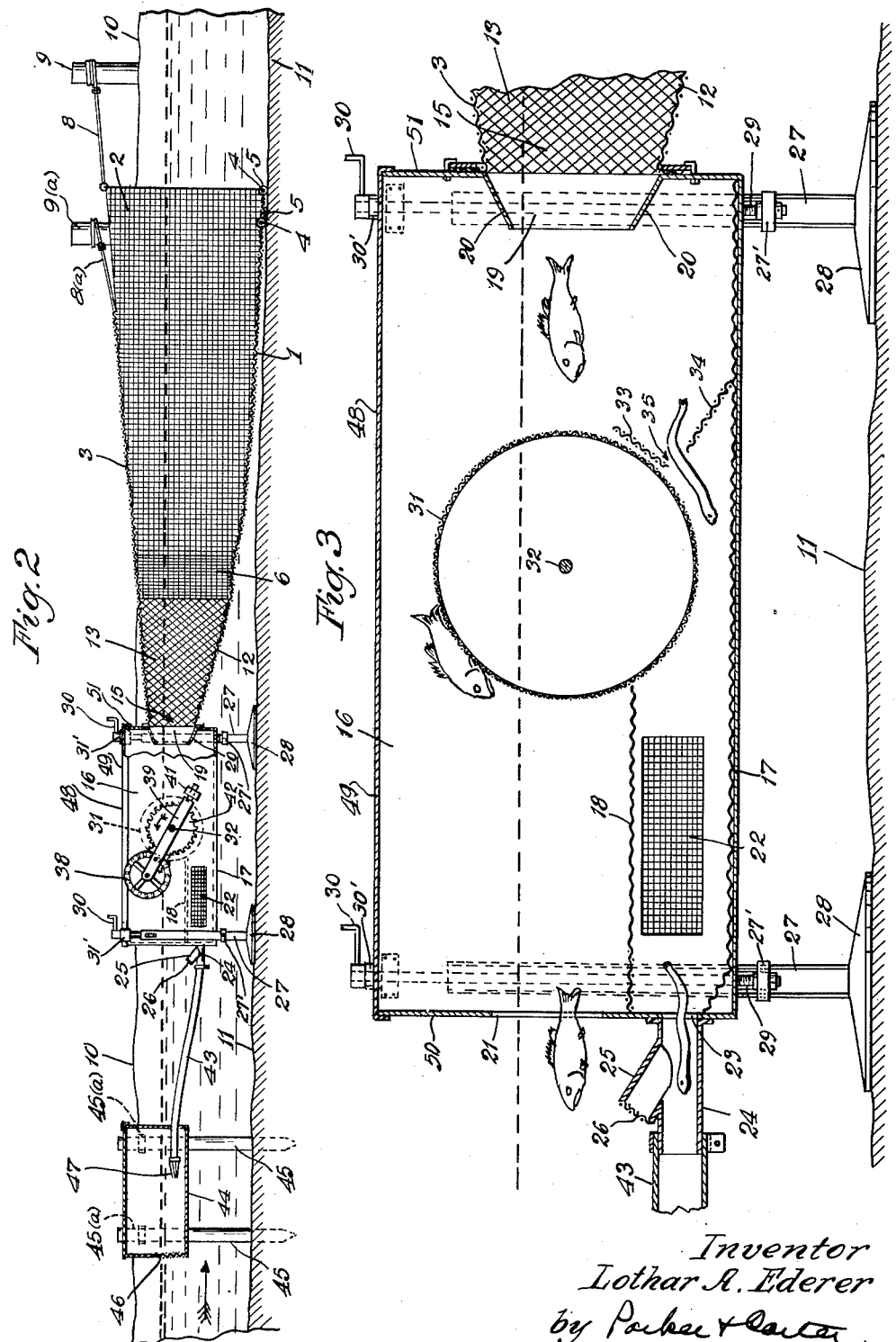

2,643,481

UNITED STATES PATENT OFFICE 2,643,481

FISH CLASSIFYING MEANS

Lothar A. Ederer, Chicago, Ill., assignor to Keal Products, Inc., Evanston, Ill., a corporation of Illinois Application August 29, 1950, Serial No. 182,045

19 Claims. (Cl. 43—105)

This invention relates to a fish trapping means and method, and has for one object to provide means for separating marine animals into categories, trapping some and freeing others.

It has for another object to provide an automatic means for trapping eels and eel-like creatures, in particular the sea lamprey.

Another object is to provide a net assembly and a mechanism for trapping marine creatures, classifying them, freeing some, isolating and keeping others, and to make such a machine and apparatus adjustable as to position.

Another object is to provide a fish classifying machine adapted automatically to classify living fish, lampreys and the like.

Other objects will appear from time to time throughout the specification and claims.

The invention is illustrated more or less diagrammatically in the accompanying drawings, wherein:

Figure 1 is a plan view with parts broken away and parts in section showing one form of the device in position in a stream;

Figure 2 is a vertical section with parts broken away and parts in section taken at line 2—2 of Figure 1; and Figure 3 is a vertical longitudinal cross section taken at line 3—3 of Figure 1 on an enlarged scale.

Like parts are indicated by like characters in the specification and drawings.

In the particular form here shown, the device comprises what may be called a funnel-like structure formed of net, a fish classifying mechanism to which the net structure is connected, and lamprey catching and retaining means connected to the classifying means. The method which will be described in connection with the apparatus illustrated is not limited to the particular mechanism shown, and the method might be carried out by the use of other mechanisms. The mechanism illustrated is, however, one suitable mechanism for carrying out the method, and it is also novel in itself.

As shown, the net structure which appears in Figures 1 and 2 comprises an inner net member having a bottom portion 1, more or less vertical side wall portions 2, and a top cover portion 3 which extends over a part, at least, of the bottom portion 1. As shown in Figure 1 in particular, the top 3 is of somewhat less extent than the bottom member 1. Adjacent its outer edge, the bottom portion 1 may be provided with reinforcing strips or members 4, 4 upon which are mounted weights 5. The side walls 2 converge, as shown particularly in Figure 1, and may include inner end portions 6 which lie at an angle to the main portions 2. The portions 6 do not meet, and provide an opening or gate-like structure 7 between their adjacent ends. Cables or supporting members 8 and 8(a) may be provided at the ends of the side portions 2, and they may when the device is in use be conveniently secured to posts or other supports 9 and 9(a) mounted on the banks 10 of a river, stream or waterway 11.

The bottom member 1 of the net may be extended beyond the area enclosed within the wall portions 2 and 6. As shown in Figure 1, the bottom member 1 extends outwardly beyond the walls 2 and 6 and comprises an additional bottom portion 12. Additional vertical walls 13, 13 are secured to the bottom portions 12 of the bottom member 1 and at one end are joined to relatively short wall portions 14, which are themselves joined to the walls 2. The top member 3 overlies the portions 12 and is secured to the walls 13 and 14. Thus, the two main wall structures 2, 2 and 13, 13 of the net assembly are, in effect, joined together by the top and bottom members 1 and 3 to form a unitary, double-walled net assembly.

The net assembly is provided with a relatively small or restricted outlet opening 15 which communicates with a fish classifying mechanism designated generally by the numeral 16. This mechanism is shown in Figures 1 and 2, and is shown in greater detail and on a larger scale in Figure 3. It comprises a casing or housing structure having top, bottom, side, and end walls 48, 17, 49, 50 and 51, respectively, which need not, in general, be described particularly because the invention is not limited to their details. Preferably, the bottom member 17 is formed of expanded metal or other foraminous material which provides only a limited proportion of solid surface and a substantial proportion of open space. A partition 18 of the same material is preferably formed within the housing of the classifier 16. The outlet opening 15 of the net assembly communicates with the inlet opening or door 19 of the classifier 16. This door may be defined by inwardly directed surface members 20. An outlet opening or door 21 is formed in the opposite wall of the classifier. In use, the classifier is positioned with the opening 19 facing downstream and the opening 21 facing upstream. Within the space bounded by the members 17 and 18 may be placed one or more openings which are covered by a relatively coarse, mesh, screen structure 22. The screen mesh is sufficiently large to permit minnows and very small fish to pass through it, and is sufficiently small to prevent the escape of larger fish, eel, sea lampreys and the like. A second upstream outlet is formed in the classifier 16, as at 23. It is connected to an outlet conduit or tube 24, as shown particularly in Figure 2. The conduit 24 may be provided with a branch or extension 25 which is provided with an opening closed by a screen 26. The classifier is mounted on supports which rest upon the bottom of the water course in which the classifier is positioned. The supports might be of fixed length, but they may conveniently be made of adjustable length so that the classifier may initially be placed in the water to the desired depth and so that thereafter it may be adjusted to maintain its preferred position with respect to the bottom of the water course and with respect to the surface of the water.

In the particular form here shown, standards 27 are supported upon bases 28 which rest upon the bottom of the body or stream of water. The standards 27 have fixed in them bearing members 27' within which screws 29 are mounted for rotation. At their upper ends the screws are provided with handles 30, one for each screw. By means of the handles the screws 29 may be rotated in the bearings 27'. The housing which includes the bottom member 17 besides member 16 and the parts attached to or supported by these members is provided at each corner with an internally threaded nut 30' which meshes with the screw 29. Rotation of the screw 29 by the handle 30 will cause relative rotation of the screw with respect to the nut 30' which is fixed to the housing and thus rotation of the screw raises and lowers a corner of the housing and the assembly carried by the housing.

The four screws will be operated in cooperation to insure proper movement of the housing and to maintain the proper level of the housing. As shown particularly in Figure 3 but generally also in Figure 2, the standard 27 may be of channel section and it will largely enclose that part of the screw 29 which is beneath the surface of the water. The particular details of the adjusting means form another essential part of the invention which is not limited to any particular adjusting means. By this means, the classifier itself may be placed in proper initial, adjusted position with respect to the bottom of the stream, and it may be raised or lowered to maintain the desired adjustment.

Mounted within the classifier 16 is a drum 31 which is carried on a shaft 32 which is itself supported and journaled in the side walls of the member 16 and extends beyond them. The drum is preferably formed with an outer cylindrical wire screen or perforated surface. This member is freely pervious to the water and will be filled with water, at least to the water level, and, in addition, as it is rotated, because of the mesh structure it tends to carry water with it above the water level of the stream and, thus, in effect, its surface, which is exposed above the water surface of the stream, will when the drum is in motion be covered with a thin layer of water, thus facilitating the passage of fish over the classifying drum itself. The means for rotating the drum will be described below. One or more guiding and deflecting members 33 and 34 are positioned within the classifier, and they are preferably formed of screen or foraminous material, although not necessarily so. A gap 35 is left between their adjacent edges and this is of a size small enough to exclude all but the smallest fish. The gap or passage 35 may be positioned anywhere at, or relatively close to, the bottom of the classifying assembly. Experience has shown that certain categories of marine creatures, such as eel, and eel-like creatures, tend to move along the bottom of streams and watercourses. Hence, the passage or opening 35 is so located that they can reach it easily and so that it will lie in their normal path. The larger fish tend to swim higher, and will normally not approach the opening 35, but will approach the drum 31 and be carried over by it in its rotation or will leap over it.

The drum will be rotated in the direction of the arrow in Figure 3. It may be rotated by any means; for example, by one or more waterwheels 38. Two such wheels are shown in Figure 1. These waterwheels are mounted upon arm assemblies 39, each of which is pivoted upon one free end of the shaft 32. The members 39 are provided with floats 40 to hold them and the wheels 38 which they carry in proper relation to the water surface of the stream, and they may also carry counterweights 41 to assist in their proper positioning. A gear train, indicated generally by the numeral 42, is positioned in each of the arm assemblies 39 and serves as a means for driving the drum through its shaft 32 in response to rotation of the waterwheel. The gear train is, in each case, so constructed that the waterwheel rotates in the desired direction; namely, counterclockwise.

Connected to each of the members 24 is a pipe or conduit 43. As shown in Figure 1, a plurality of these conduits is provided and they lead to one or more traps or catching containers. As shown in Figure 1, there are two such traps, each of which is designated by the numeral 44. The traps are supported in any desired manner and, generally, are partially above and partially below the surface of the water. As shown, the traps are carried on standards or posts 45, by means of which they are properly positioned and firmly supported, as by bands or loops 45(a) passed about the posts 45 and secured to the traps 44. The traps are formed of walls, the details of which need not be described as the invention is not limited to any particular details of wall construction. Each trap is, however, provided with an open end or an opening in its end which faces upstream. In each of these openings is provided a screen 46. Because the opening is upstream, water flowing along the stream moves through the opening and fills the trap 44 and flows through the conduits 43 moving downstream through those conduits and enters the classifier 16 through the members 24. Thus, a current is provided through the conduits 43 flowing downstream in the same direction as the unimpeded flow of water within the stream itself. Sea lampreys and the like which have gotten into the space between the members 17 and 18 encounter a current against which, by instinct, they tend to swim, and, thus, in swimming against this current, they move upwardly through the conduits 43 and emerge into the traps or boxes 44. Preferably, the ends of the conduits 43 which are within the boxes 44 are provided with entrapment members 47 which may be of light, spring-like material. They are biased to remain normally in the position shown in Figure 2, to open or widen at the upstream ends thereof upon the passage therethrough of eels, and to return thereafter to the position shown in Figure 2. They are sufficiently flexible so that sea lampreys can readily displace them to emerge from the conduits 43 and escape into the traps 44, but, because of their bias, they resume a closing position when a sea lamprey has emerged and prevent his return into the conduit 43. Hence, the lampreys remain in the trap 44 and may later be removed.

Although I have shown an operative form of my invention, it will be recognized that many changes in the form, shape and arrangement of parts can be made without departing from the spirit of the invention, and my showing is, therefore, to be taken as, in a sense, diagrammatic.

The use and operation of this invention are as follows:

The use of this device has been suggested above. In general, it is as follows: The system or apparatus is mounted in a watercourse, as shown in Figure 1. The net structure spans the entire watercourse and extends from the bottom of the stream to a point above the upper water surface. Thus, any fish or marine animal moving upstream will come into the net structure, and, in moving upstream instinctively to the spawning grounds, will move through the net structure, through the openings 7 and 19 and reach the classifier. Small minnows and very small fish may go anywhere in the classifier, but will normally emerge through the mesh screen 22. Larger fish cannot pass through the opening 35 between the members 33 and 34, and will, therefore, in one way or another pass over the drum 31. They may leap it in the way that fish are known to leap barriers, waterfalls, and the like in moving upstream. If they do not do this voluntarily they will normally be carried over the drum by the motion of the drum and the water which is entrained with the drum and carried over it. Once the fish have passed over and beyond the drum 31, they are free to leave through the door 21 and, thus, to move upstream unimpeded. The classifier is thus positioned to classify the fish and the lampreys and to separate the lampreys from the other marine creatures. Once the lampreys have been separated, their only escape from the system is to move upstream again in the face of and against the current which is running downstream through the conduits 43 from the trap boxes 44. As they move instinctively against this current, they will work their way through the conduits 43 and reach the boxes 44. They cannot escape from these boxes because the mesh 46 is too small to permit them to do so, and because the construction of the outlet ends of the tubes or conduits 43 is such that they cannot reenter them. Hence, they remain entrapped in the trap boxes 44 and may be removed and destroyed at will.

The apparatus described and illustrated herewith thus comprises means; first, for interrupting the movement of marine creatures moving upstream; second, for causing marine creatures to move to and into a classifying mechanism; third, for classifying creatures within the classifier; fourth, for discharging certain creatures for further uncontrolled movement; fifth, for continuing the movement of a selected category of marine creatures to a point for collection and ultimate destruction. The device disclosed provides means for accomplishing this result and for carrying out the method of the collection, classification, segregation and ultimate destruction of a selected class of marine creatures.

In particular, the invention is not limited to the particular details of the net structure. A simpler net structure might be used and would comprise merely means for spanning all, or substantially all, of the width and depth of the stream and for collecting and guiding substantially all of the marine creatures moving upstream to and into the classifier. The particular net structure shown has advantages of stability and strength, but the invention is not limited to it. In a similar fashion, the particular classifier might be modified. The invention is, therefore, not limited as to mechanism or method to the exact structure and steps disclosed herein.

Since one of the main objects of this invention is to provide a means and method for removing the destructive sea lamprey from the water for destruction, it is important that the classifying mechanism be so made that the lamprey cannot pass through it. The lamprey will normally go to the bottom of any body of water in which he finds himself. Hence, he will normally seek the bottom of the classifier. The lamprey has highly developed suction mechanisms by means of which he can adhere to surfaces and be carried along with them if they move. In this manner, he moves by clinging to the bottom of vessels. He may also, to some degree, move himself along in this manner. Hence, it is important to prevent his moving through the classifier and that the surfaces with which he can come in contact be made in such a manner that he cannot by suction cling to them. It is for this reason that the bottom 17 is made of expanded metal or other comparable material. It is for this reason that the partition 18 is so made. The partitions 33 and 34 being of screen material have the same effect and he cannot cling to them by suction. Also, he cannot cling to the drum 31 by suction. The entire structure of the classifier may be made of material such as expanded metal, perforated metal screen structures and other foraminous material to which the lamprey cannot cling by suction. Hence, he will not be carried over the drum by clinging to it, nor can he make his way through the classifier in any fashion by suction. Obviously, since he tends to seek the lowest possible level in a body of water, the provision of structural parts to which he cannot cling by suction is more important in the bottom or lower levels of the classifier, but it is also advantageous to make similar provisions elsewhere and sometimes it is desirable to make the entire classifier of such, so to speak, "antisuction material."

I claim:

1. The method of removing living lampreys from a body of water containing other types of marine life which comprises the following steps: obstructing a flowing body of water, thereby collecting marine life in said body of water, guiding said life to and into a classifying zone, therein classifying said life and removing the lampreys from the other types of life, discharging all but the lampreys into said body of water, guiding the lampreys upstream from the classifier along restricted currents of water, and collecting said lampreys in containers.

2. The method of removing living lampreys from a body of water containing other types of marine life which comprises the following steps: obstructing a flowing body of water, thereby collecting marine life in said body of water, guiding said life to and into a classifying zone, therein classifying said life and removing the lampreys from the other types of life, discharging all but the lampreys into the body of water, guiding the lampreys upstream from the classifier along restricted currents of water, and collecting said lampreys in containers through which a moving current of water passes.

3. The method of removing living lampreys from a body of water containing other types of marine life which comprises the following steps: obstructing a flowing body of water, thereby collecting marine life in said body of water, guiding said life to and into a classifying zone, therein classifying said life and removing the lampreys from the other types of life, discharging all but the lampreys freely into said body of water, guiding the lampreys upstream from the classifier along restricted currents of water, and collecting said lampreys in containers.

4. The method of removing living lampreys from a body of water containing other types of marine life which comprises the following steps: obstructing a flowing body of water, thereby collecting marine life in said body of water, guiding said life to and into a classifying zone, therein classifying said life and removing the lampreys from the other types of life, discharging all but the lampreys freely into said body of water, guiding the lampreys upstream from the classifier along restricted currents of water, and collecting said lampreys in fixed containers through which a moving current of water passes.

5. The method of removing living lampreys from a body of water containing other types of marine life which comprises the following steps: obstructing the entire cross section of a flowing body of water, thereby collecting marine life in said body of water, guiding said life to and into a classifying zone, therein classifying said life and removing the lampreys from the other types of life, discharging all but the lampreys freely into said body of water, guiding the lampreys upstream from the classifier along restricted currents of water, and collecting said lampreys in fixed containers through which a moving current of water passes.

6. The method of separating lampreys from other types of marine life in a body of water which comprises the steps of obstructing marine life moving upstream, collecting such life so obstructed and guiding it to a classifying zone, classifying said marine life within said zone and segregating said lampreys from all other classes, thereafter guiding said lampreys so removed along a downstream flowing path, and finally collecting said lampreys after they have moved upwardly along said path.

7. The method of separating lampreys from other types of marine life in a body of water which comprises the steps of obstructing marine life moving upstream, collecting such life so obstructed and guiding it to a classifying zone, classifying said marine life within said zone and segregating said lampreys from all other classes, thereafter guiding said lampreys so removed along a plurality of downstream flowing paths, and finally collecting said lampreys after they have moved upwardly along said paths.

8. The method of separating lampreys from other types of marine life in a body of water which comprises the steps of obstructing marine life moving upstream, collecting such life so obstructed and guiding it to a classifying zone, classifying said marine life within said zone and segregating said lampreys from all other classes, thereafter guiding said lampreys so removed along a downstream flowing restricted path, and finally collecting said lampreys after they have moved upwardly along said restricted path.

9. The method of separating lampreys from other types of marine life in a body of water which comprises the steps of obstructing marine life moving upstream, collecting such life so obstructed and guiding it to a classifying zone, classifying said marine life within said zone and segregating said lampreys from all other classes, thereafter guiding said lampreys so removed along a plurality of downstream flowing restricted paths, and finally collecting said lampreys after they have moved upwardly along said restricted paths.

10. The method of separating lampreys from other types of marine life in a body of water which comprises the steps of obstructing marine life moving upstream, collecting such life so obstructed and guiding it to a classifying zone, classifying said marine life within said zone and segregating said lampreys from all other classes, thereafter guiding said lampreys so removed upstream along a plurality of downstream flowing restricted paths, and finally collecting said lampreys after they have moved upwardly along said restricted paths.

11. In combination in a classifying assembly for classifying marine life, a collecting means, a classifier, and a gathering means, said collecting means comprising a traplike enclosed member, a liquid conduit connecting said traplike enclosed member to said classifier, said classifier comprising a housing having an entrance and a plurality of exits, one exit being freely open, another exit being connected to said conduit, an obstruction within said classifier, and means for guiding one class of marine life beneath said obstruction and to said conduit, said gathering means being positioned downstream of said classifier and shaped to direct marine life into said classifier.

12. In combination in a classifying assembly for classifying marine life, a collecting means, a classifier, and a gathering means, said collecting means comprising a traplike enclosed member, a liquid conduit connecting said traplike enclosed member to said classifier, means for establishing a current of liquid flowing through said collecting means, said conduit and to said classifier, said classifier comprising a housing having an entrance and a plurality of exits, one exit being freely open, another exit being connected to said conduit, an obstruction within said classifier, and means for guiding one class of marine life beneath said obstruction and to said conduit, said gathering means being positioned downstream of said classifier and shaped to direct marine life into said classifier.

13. In combination in a classifying assembly for classifying marine life, a collecting means, a classifier, and a gathering means, said collecting means comprising a traplike enclosed member, a liquid conduit connecting said traplike enclosed member to said classifier, said classifier comprising a housing having an entrance and a plurality of exits, one exit being freely open, another exit being connected to said conduit, an obstruction within said classifier, means for rotating said obstruction, and means for guiding one class of marine life beneath said obstruction and to said conduit, said rotation of said obstruction being effective to assist other classes of marine life to pass over said obstruction, said gathering means being positioned downstream of said classifier and shaped to direct marine life into said classifier.

14. In combination in a classifying assembly for classifying marine life, a collecting means, a classifier, and a gathering means, said collecting means comprising a traplike enclosed member, a liquid conduit connecting said traplike enclosed member to said classifier, said classifier comprising a housing having an entrance and a plurality of exits, one exit being freely open, another exit being connected to said conduit, an obstruction within said classifier, and means for guiding one class of marine life beneath said obstruction and to said conduit, said obstruction and the passages beneath it being formed of foraminous material, said gathering means being positioned downstream of said classifier and shaped to direct marine life into said classifier.

15. In combination in a classifying assembly for classifying marine life, a collecting means, a classifier, and a gathering means, said collecting means comprising a traplike enclosed member, a liquid conduit connecting said traplike enclosed member to said classifier, said classifier comprising a housing having an entrance and a plurality of exits, one exit being freely open, another exit being connected to said conduit, an obstruction within said classifier, means for rotating said obstruction, and means for guiding one class of marine life beneath said obstruction and to said conduit, said rotation of said obstruction being effective to assist other classes of marine life to pass over said obstruction, said obstruction and the passages beneath it being formed of foraminous material, said gathering means being positioned downstream of said classifier and shaped to direct marine life into said classifier.

16. In combination in a classifying assembly for classifying marine life, a collecting means, a classifier, and a gathering means, said collecting means comprising a traplike enclosed member, a liquid conduit connecting said traplike enclosed member to said classifier, said classifier comprising a housing having an entrance and a plurality of exits, one exit being freely open, another exit being connected to said conduit, an obstruction within said classifier and extending above and below the liquid surface, means for rotating said obstruction, and means for guiding one class of marine life beneath said obstruction and to said conduit, said rotation of said obstruction being effective to assist other classes of marine life to pass over said obstruction, said gathering means being positioned downstream of said classifier and shaped to direct marine life into said classifier.

17. In combination in a classifying assembly for classifying marine life, a collecting means, a classifier, and a gathering means, said collecting means comprising a traplike enclosed member, a liquid conduit connecting said traplike enclosed member to said classifier, means for establishing a current of liquid flowing through said collecting means, said conduit and to said classifier, said classifier comprising a housing having an entrance and a plurality of exits, said exits being upstream from said entrance, one exit being freely open, another exit being connected to said conduit, an obstruction within said classifier and extending above and below the liquid surface, means for rotating said obstruction, and means for guiding one class of marine life beneath said obstruction and to said conduit, said gathering means being positioned downstream of said classifier and shaped to direct marine life into said classifier.

18. In combination in a classifying assembly for classifying marine life, a collecting means, a classifier, and a gathering means, said collecting means comprising a traplike enclosed member, a liquid conduit connecting said traplike enclosed member to said classifier, means for establishing a current of liquid flowing through said collecting means, said conduit and to said classifier, said classifier comprising a housing having an entrance and a plurality of exits, one exit being freely open, another exit being connected to said conduit, an obstruction within said classifier and extending above and below the liquid surface, means for rotating said obstruction, and means for guiding one class of marine life beneath said obstruction and to said conduit, said rotation of said obstruction being effective to assist other classes of marine life to pass over said obstruction, said obstruction and the passages beneath it being formed of foraminous material, said gathering means being positioned downstream of said classifier and shaped to direct marine life into said classifier.

19. In combination in a classifying assembly for classifying marine life, a collecting means, a classifier, and a gathering means, said collecting means comprising a traplike enclosed member, a liquid conduit connecting said traplike enclosed member to said classifier, means for establishing a current of liquid flowing through said collecting means, said conduit and to said classifier, said classifier comprising a housing having an entrance and a plurality of exits, said exits being upstream from said entrance, one exit being freely open, another exit being connected to said conduit, an obstruction within said classifier and extending above and below the liquid surface, means for rotating said obstruction, and means for guiding one class of marine life beneath said obstruction and to said conduit, said rotation of said obstruction being effective to assist other classes of marine life to pass over said obstruction, said obstruction and the passages beneath it being formed of foraminous material, said gathering means being positioned downstream of said classifier and shaped to direct marine life into said classifier.

LOTHAR A. EDERER.

References Cited in the file of this patent

UNITED STATES PATENTS

| Number | Name | Date |
|---|---|---|
| 769,910 | Melbye | Sept. 13, 1904 |